United States Patent
Takamine

[11] 3,967,132
[45] June 29, 1976

[54] AIR OPERATED POWER TRANSFER APPARATUS

[76] Inventor: Bruce N. Takamine, 685 Iwalani St., Hilo, Hawaii 96720

[22] Filed: Nov. 26, 1974

[21] Appl. No.: 527,489

[52] U.S. Cl. .............................. 290/4 R; 290/30 R; 60/404
[51] Int. Cl.² ................... F02D 25/00; F02N 11/08
[58] Field of Search ............ 60/404, 327, 407, 412; 290/30 R, 30 A, 4 R

[56] References Cited
UNITED STATES PATENTS

| | | | |
|---|---|---|---|
| 2,783,393 | 2/1957 | Lindahl et al. | 290/30 R X |
| 2,920,211 | 1/1960 | Gotoh | 290/4 R |
| 3,368,082 | 2/1968 | Oberlander | 290/30 R X |

Primary Examiner—Edgar W. Geoghegan
Attorney, Agent, or Firm—William B. Walter

[57] ABSTRACT

Apparatus for providing power to run essential machinery ordinarily run by an electrical main powered motor has a stand-by engine coupled by automatic clutch to the machinery to be driven. A compressed air system is fed by an electric motor driven compressor deriving its power from the electric supply main and by the stand-by engine driven compressor during periods of power failure. This system holding compressed air in reserve in a storage tank is used for powering a pneumatic motor to start the engine upon failure of power in the electric supply main. The supply of compressed air to the starter motor and to operate an engine operation switch is controlled by a power failure detector system also air operated which normally withholds compressed air from the pneumatic starter motor, but upon failure allows passage of the air to the starter motor. An engine running detector in turn controls pneumatically the starter valve system to stop the flow of air to the starter motor thus stopping the starter motor once the engine is running. A time delay in the power failure detector prevents starting the stand-by engine during momentary losses of power. As power is restored in the electric supply main, the power failure detector turns the engine switch off thus stopping the stand-by engine.

23 Claims, 6 Drawing Figures

AIR OPERATED POWER TRANSFER APPARATUS

BACKGROUND OF THE INVENTION

Blackouts and brownouts of the electric utility systems have been occurring with greater frequency because of the energy crisis. Storms also cause power failures which in this age of dependence upon public power systems leaves many essential functions vulnerable. Amongst these essential functions are the filling of reservoirs and other supply tanks for water systems, lift pumps for sewage systems, oil pumping stations, compressors for refrigeration plants, and fuel pumps for large heating systems.

Conventional stand-by power units are designed to supply electrical power to the portion of the load to which they are assigned in the same manner as the electrical utility systems. A smooth transition of transfer of the electrical load from the supply main to the stand-by power system and vice versa allowing time for starting and stopping the stand-by engine has been a matter of design refinements throughout many years. In such a system, the stand-by engine drives an electrical generator the output of which must be connected and disconnected from the load by switch gear. Such switches must not only be relatively free from damage due to arcing, in breaking contacts under electrical load, but also due to welding of contacts together by the load. In some systems, switches open as the voltage in the main drops to 33% of normal and close when this voltage returns to 80% of normal voltage. If the load includes incandescent lamps, the inrush current for the lamps can be 10 to 20 times the normal full-load rating and the power transfer switches as well as the generator and stand-by engine must be designed and rated for these high inrush loads. Selection of components and overall design of the conventional stand-by system thus has relied heavily upon electrical generators, controls, switches, engine starters, storage batteries which must be replaced every few years, and battery charging systems even where the load need not be electrical. These components require highly paid; skilled technicians for maintaining, repairing, and frequent reliability checking. Such workers are few and being specialists are not always readily available in an emergency. The reliability of this type of system is thus dependent upon the availability of sophisticated components and the services of skilled technicians. The capital and operating cost of this equipment can be high because of design refinements and high inrush load capacity in comparison to normal operating load.

BRIEF SUMMARY OF THE INVENTION

A primary object of this invention is to provide apparatus to be used for transferring a load from a defective main power source to a load, which apparatus will be reliable, comprise relatively simple and inexpensive components, and which can be maintained and repaired and repair by semi-skilled workers.

This invention is a power transfer apparatus utilizing a compressed air supply to detect power failure in an electrical main, for controlling the starting and stopping of the stand-by engine, and to provide the energy required for starting the engine thus performing the essential functions of a power transfer apparatus with a minimum of electrical units. In the apparatus of this invention, energy for starting the engine is compressed air, or some other gas, stored in a pressure vessel thus eliminating the costly and less reliable electrical storage battery.

Another object of this invention is to provide power transfer apparatus which would constitute a minimum of fire hazard due to being an ignition source.

Another object of this invention is to provide power transfer apparatus which will be less vulnerable to failure due to electrical storms.

Another object of this invention is to provide power transfer apparatus which is adaptable to more directly power essential units without requiring the generation of electricity.

BRIEF DESCRIPTION OF THE DRAWINGS

In the drawings FIGS. 2 through 5 show variations of the invention while

DETAILED DESCRIPTION OF THE DISCLOSURE

Figure 1:
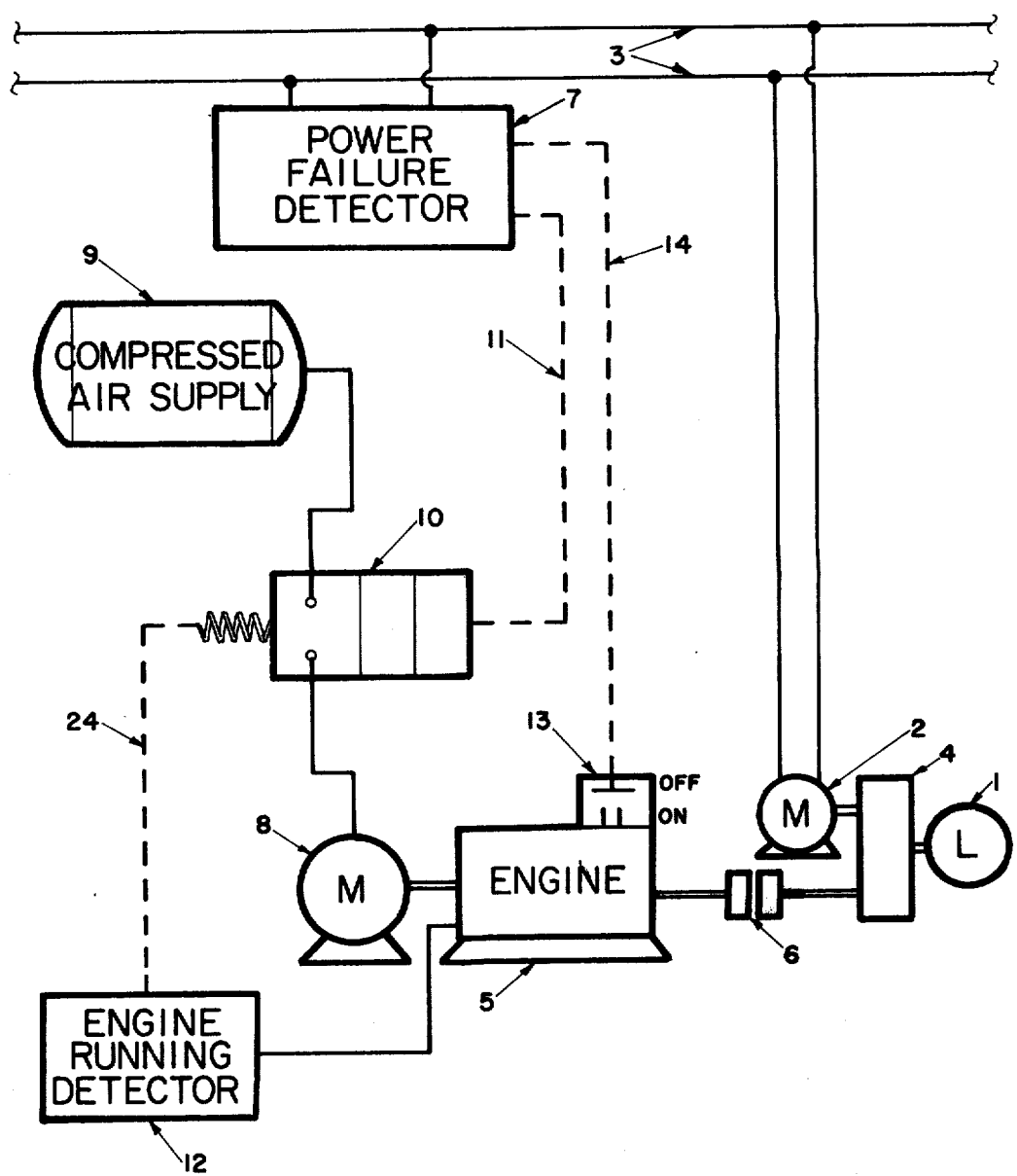
FIG. 1 is a block diagram of the power transfer apparatus of this invention.

Referring to the drawings, the basic compressed air controlled power transfer apparatus as seen in block diagram in FIG. 1 shows the power demands of load 1 met by motor 2 deriving its power from the normal electric supply main 3. Motor 2 drives the load 1 through transmission 4. To meet the demand for power when it is not available from electric supply 3, a stand-by engine 5 drives load 1 through clutch 6 and the transmission 4.

A power failure detector 7 connected to the electric supply 3 is used to control the starting of engine 5 when power fails in the electric supply 3 and to stop the engine 5 when power is restored in electric supply 3. A pneumatic starter motor, 8 which may be a separate unit, or consist of one or more cylinders of the stand-by engine 5, or consist of the turbine blades of the standby engine if the engine is a gas turbine, is engaged with the engine drive shaft so as to drive the engine for starting. A compressed air supply 9 is connected to the starter motor 8 by a starter valve 10 when the valve is open to drive the starter motor 8. When the starter valve 10 closes, it shuts off the connection between the compressed air supply 9 and the motor 8 to stop the motor 8. An operative connection 11 between starter valve 10 and power failure detector 7 serves to open the starter valve 10 when power fails and to close it when power is restored.

An engine running detector 12 which is connected to the engine 5 to sense the point at which during starting the engine has caught and is self-sustaining, is operatively connected by line 24 to the starter valve 10. This engine running detector 12 overrides the power failure detector 7 to close the starter valve 10 when the engine is running, thus shutting off the supply of compressed air to the engine starter motor 8.

An engine running switch 13 is connected to the engine 5 to allow it to run or stop it by control of the fuel or ignition system, and is connected to the power failure detector 7 by operative connection 14 so as to turn the switch on to allow the engine to start and run when the power fails and to turn the switch off to stop the engine when power is restored in the electric supply 3.

Variations of the details of the apparatus of my invention are shown in FIGS. 2 through 6. These will be explained element by element below.

Compressed Air Supply

A supply of compressed air is required to drive the pneumatic starter motor 8 for the stand-by engine, and a supply is needed for use as a working fluid and source of energy in control elements such as the power failure detector 7, the engine running detector 12, the starter valves 10, and the engine operation switch 13. The compressed air supply 9 comprises a storage tank 15 which can be filled by an electrically driven air compressor 16 connected to main 3, and recharged by the engine driven compressor 17 during stand-by operation. Alternatively the compressed air supply may be a portion of a factory compressed air supply system.

Power Failure Detector

The power failure detector 7 of this apparatus is a valve means which causes the pressure, in a control piping, to change when the power in the electric supply main 3 fails. The control piping includes the operative connection 11 between the power failure detector 7 and the starter valve 10 and the operative connection 14 between the power failure detector 7 and the engine switch 13 or 113.

Figure 2:
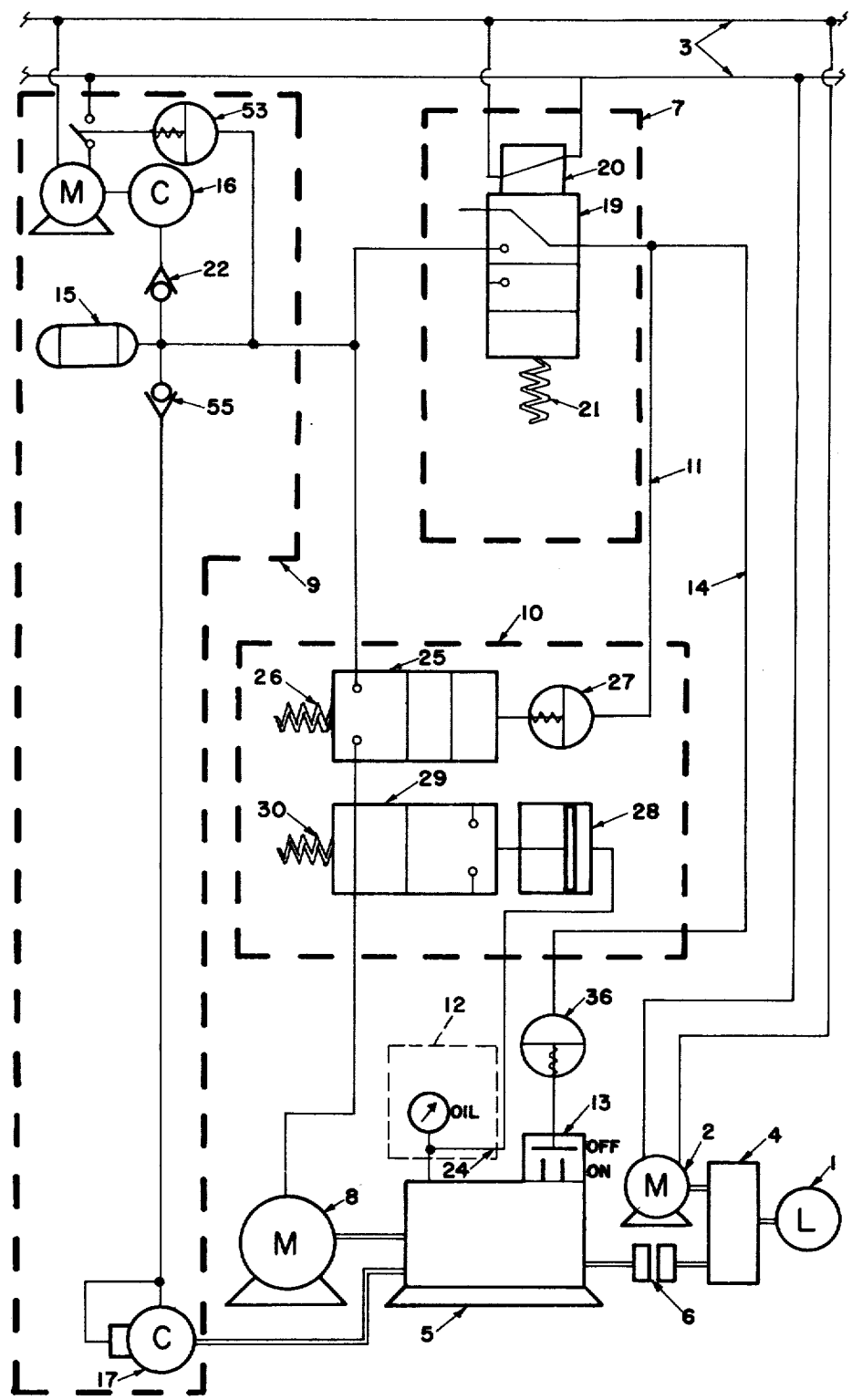

In the apparatus of FIG. 2, when power is on, air in the control piping 11 and 14 is vented to atmosphere through power failure detector valve 19 which is held in the position shown by solenoid 20 connected to the supply main 3. When power fails, bias spring 21 overcomes solenoid 20 changing the position of valve 19 connecting piping 11 and 14 with tank 15 thus pressurizing actuators 27 and 36.

In the apparatus of FIGS. 3 through 6 the reverse action occurs with the power failure detector 7 holding the pressure in control piping 11 and 14 at supply pressure when power is on and venting it to atmosphere when power fails.

Figure 3:
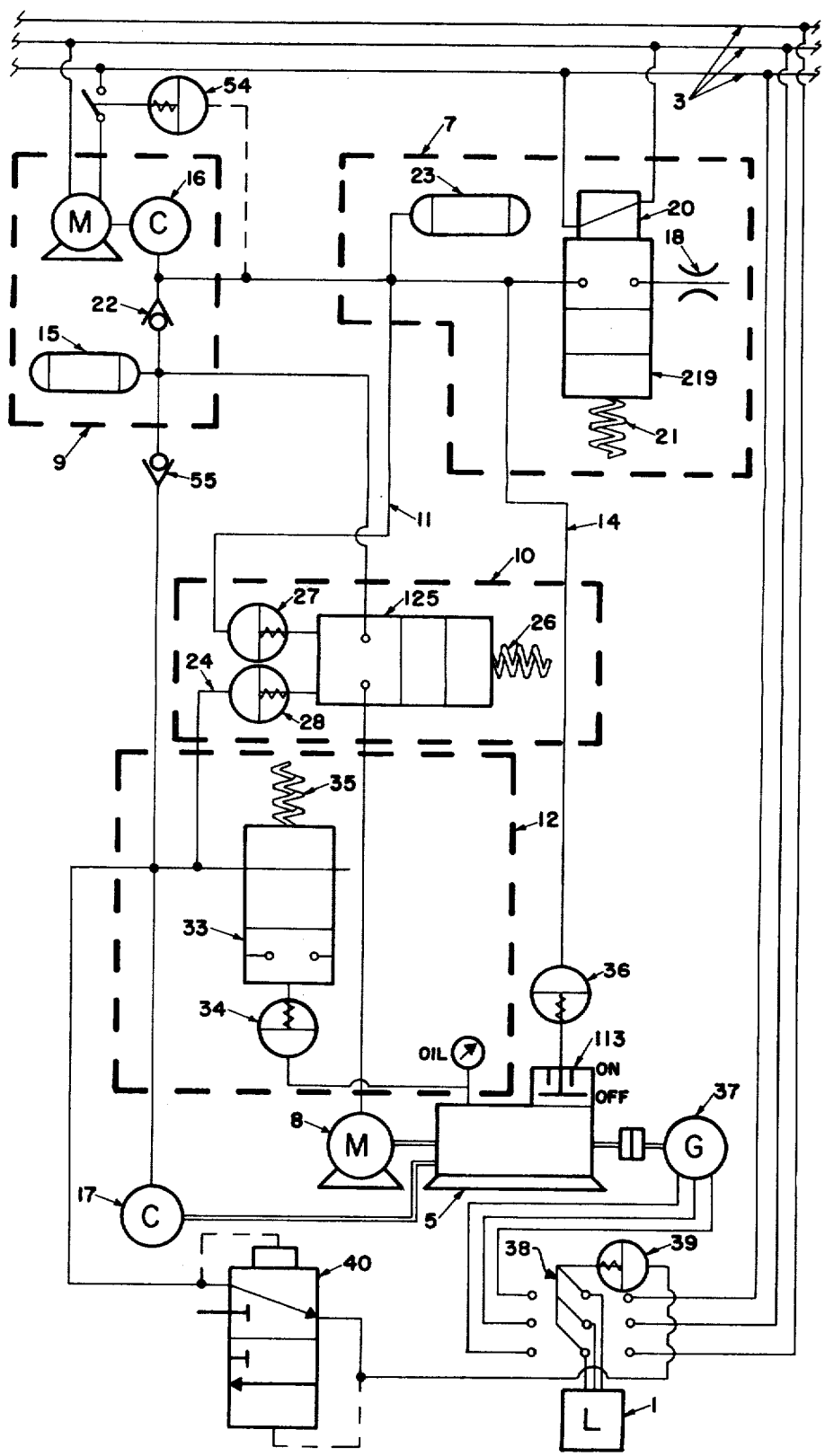
Figure 5:
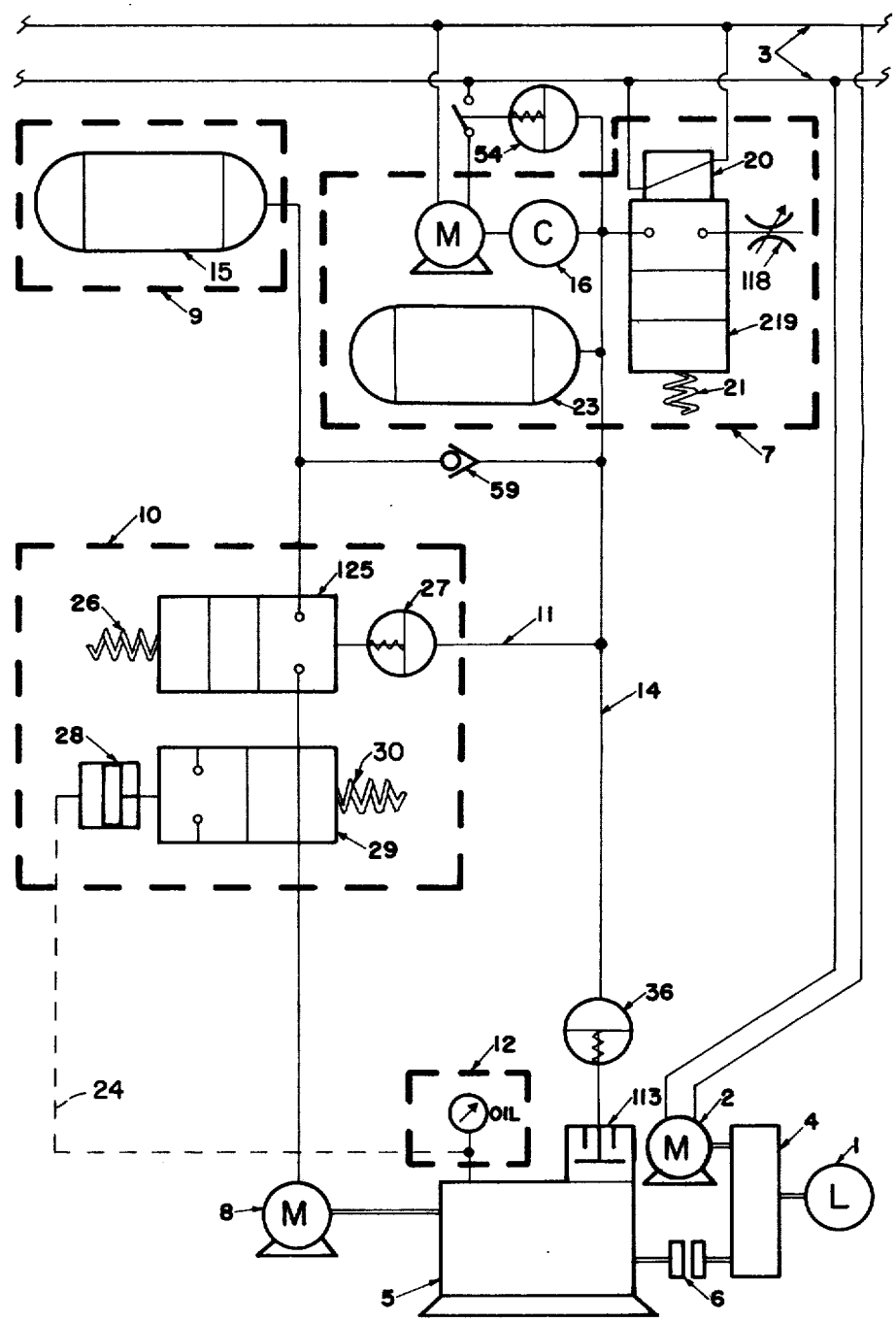
Figure 6:
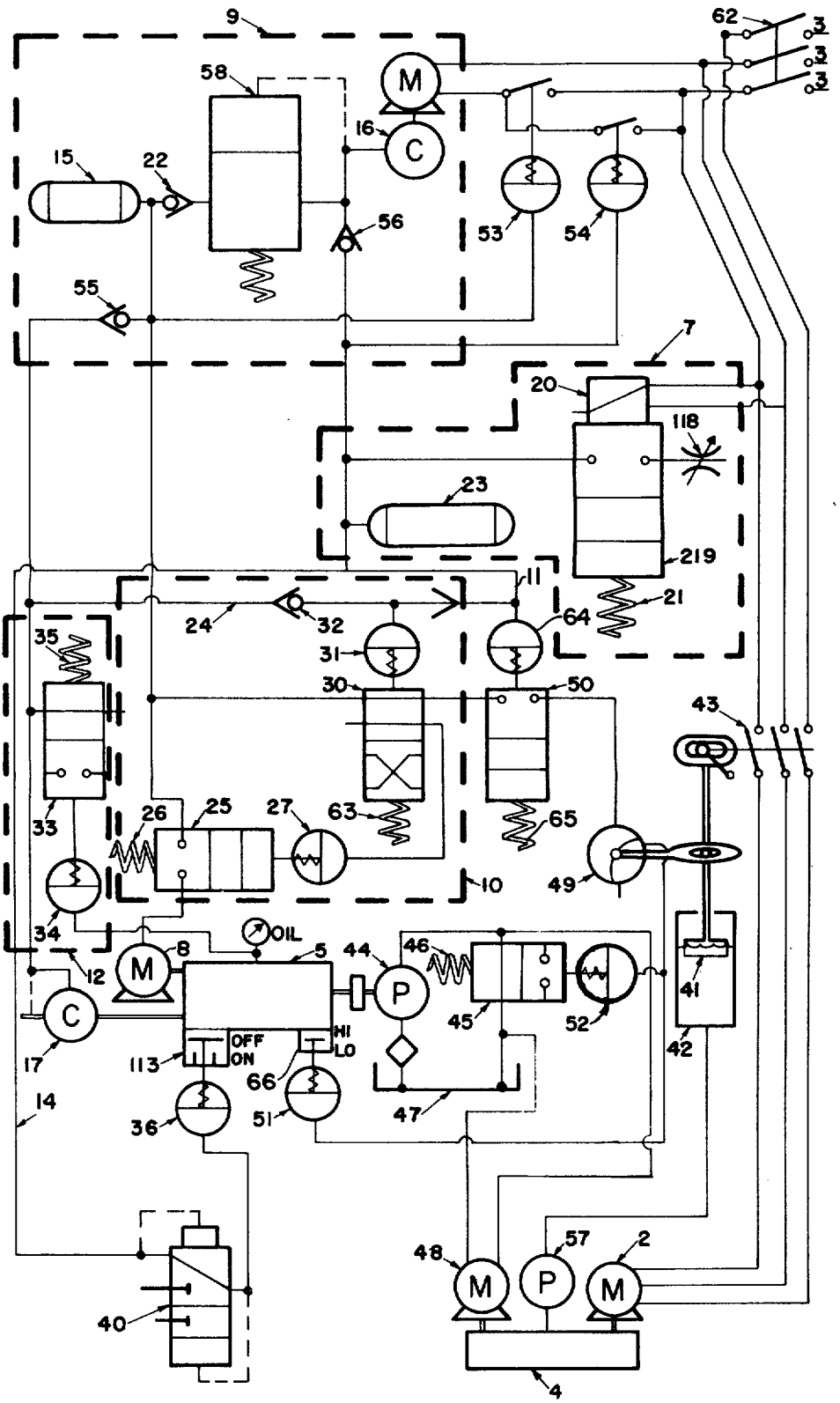
FIG. 6 shows a preferred embodiment.

In the apparatus of FIGS. 3, 5, and 6 when power is on, solenoid 20 holds valve 219 closed thus retaining air in control piping 11 and 14 at supply pressure. When power fails, bias spring 21 overcomes solenoid 20 to change the position of valve 219 so as to release air from the control piping 11 and 14 to atmosphere through valve 219 and restricted vent 18 or 118.

Figure 4:
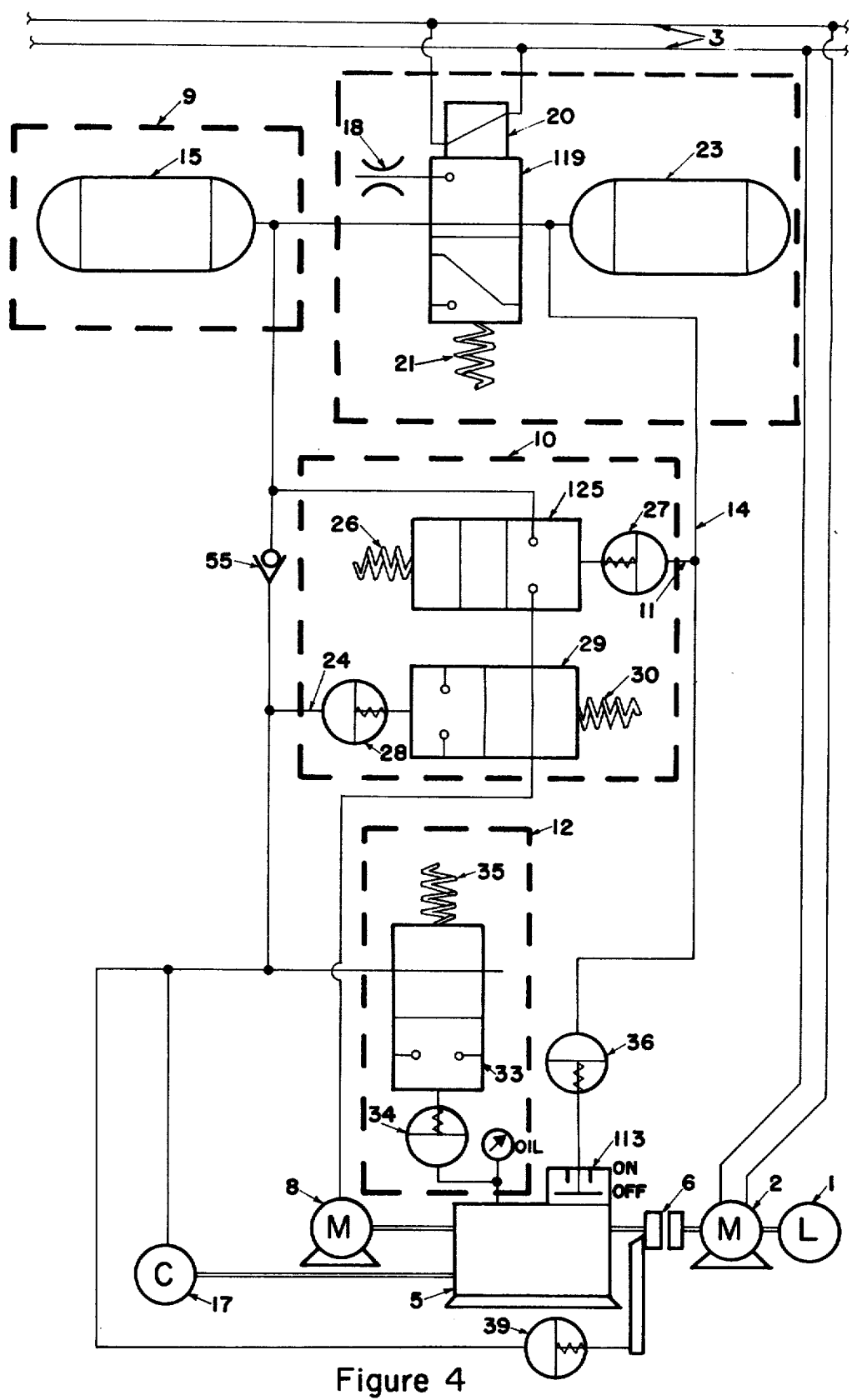

In the apparatus of FIG. 4 when power is on, solenoid 20 holes valve 119 in the position shown connecting control piping 11 and 14 to the supply tank 15. Upon power failure bias spring 21 overcomes solenoid 20 to change the position of valve 119 to that shown in the lower half of the valve diagram, closing off the line from the supply tank 15 and venting the control piping 11 and 14 to atmosphere through valve 219 and through restricted vent 18.

Power Failure Detector Time Delay

So that a power transfer will not occur during momentary power failures of the order of 10 minutes or less a form of time delay is provided and shown in the apparatus of FIGS. 3 through 6. Although an ordinary dashpot could be used to slow down the action of valve 19, 119, or 219 such time delay action has a practical limit of much less than a minute. In my apparatus the time to release air under pressure from control piping 11 and 14 upon power failure through restricted vent 18 is greatly amplified by addition of a second storage tank 23. Adjustment of the length of time delay is provided by an adjustable restriction 118 in the system of FIG. 6.

Starter Valve

In power transfer apparatus of this invention, upon failure of power in main 3, a signal sent from detector 7 to starter valve 10 opens valve 10 to discharge compressed air from supply 9 into starter motor 8 to start the engine 5. When the engine running has started, engine detector 12 sends a signal to starter valve 10 to shut off the supply of compressed air to the starter motor 8. In the diagram of FIG. 1, a single starter valve 10 performs both functions as regulated by the power failure detector 7 through operative connection 11 and by enging running detector 12 through operative connection 24.

In FIG. 3 a single starter valve 125, which is biased to an open position by spring 26 is closed when power is on by actuator 27 charged by compressed air from compressor 16 and tank 23 through control piping 11, or is closed when the engine 5 is running by actuator 28 charged by compressed air from engine driven compressor 17 through control piping 24.

The starter valve 10 of FIG. 2 comprises two spring biased shutoff valves 25 and 29 in series. During power "on" operation, valve 29 is held open by bias spring 30 while valve 25 is held closed by bias spring 26. Upon power failure, compressed air from the power failure detector 7 causes actuator 27 to open valve 25 allowing compressed air to discharge from tank 15 through the two elements 25 and 29 of starter valve 10 to the starter motor 8. When the engine starts, the pressure in the engine lubrication oil system builds up and by its connection 24 to actuator 28 causes valve 29 to close and remain closed as long as the engine is running.

The starter valve 10 of FIGS. 4 and 5 is comprised of two spring-biased shutoff valves 125 and 29. Valve 125 is spring biased to an open position and held closed when power is on by an actuator 27 connected to the power failure detector 7 by control piping 11. The two shutoff valves are connected in series so that both valves must be open to pass compressed air to the starter motor 8.

When power fails and pressure in the control piping 14 drops sufficiently, actuator 27 is overcome by spring bias 26 to open valve 125. Valve 29 is normally held in an open position by spring bias 30 and closed when the engine 5 is running by actuator 28 connected to engine running detector 12 by control piping 24.

The starter valve 10 of FIG. 6 includes a shutoff valve 25 biased by spring 26 to a closed position, actuator 27 being vented to atmosphere through four-way valve 30 which is held in the position shown by pressure from the power failure detector 7 on actuator 31. When the stand-by engine 5 is running, the engine running detector valve 33 closes so that compressed air from the engine operated compressor 17 through connection 24 and shuttle valve 32 holds valve 30 in position venting actuator 27 to allow spring 26 to close starter valve 25.

When power fails, air in the power failure detector 7 drops to atmospheric pressure and four-way valve 30 is shifted by spring 53 connecting actuator 27 to the compressed air tank 15 to open the starter valve 25.

Engine Running Detector

The engine running detector can be any one of a variety of devices including engine driven tachometers, engine driven generators, oil pressure indicator systems, or starter throwout clutches. In the apparatus of FIGS. 2 through 6 oil pressure of the stand-by engine 5 is used as an indicator that the engine has been started and is running. The engine running detector 12 is used to shut-off the supply of compressed air to the starter motor 8 for the stand-by engine 5 when the engine 5 starts and is running.

In the apparatus of FIGS. 2 and 5, the engine running detector 12 consists of the actuator 28 which is operated directly by engine oil pressure from the stand-by engine 5 to close the starter valve 29 when the engine 5 is running. This shuts off the supply of compressed air to the starter motor 8. When the stand-by engine 5 is stopped, engine oil pressure drops so that actuator 28 allows bias spring 30 to open starter valve 29.

In the apparatus of FIGS. 3. 4 and 6, the engine running detector 12 consists of the actuator 34 which is operated directly by engine oil pressure from the stand-by engine 5 to close a shut-off valve 33 against a bias spring 35 when the engine 5 is running and as the engine oil pressure drops when the engine 5 stops, to allow the valve 33 to open.

In the apparatus of FIG. 3, when the engine 5 is running, the valve 33 is closed, and compressed air from the engine driven compressor 17 charges the actuator 28 to close the starter valve 125, shutting off the supply of compressed air to the starter motor 8. When the engine 5 stops, and valve 33 opens, compressed air in the actuator 24 is discharged through valve 33 to allow the starter valve 125 to open unless actuator 27 is charged.

In the apparatus of FIG. 4, when the engine 5 is running, valve 33 is closed and compressed air from the engine driven compressor 17 charges actuator 28 to close the starter valve 29 shutting off the supply of compressed air to the starter motor 8. When the engine 5 stops and valve 33 opens, compressed air in actuator 24 is discharged through valve 33 to allow the starter valve 29 to open.

In the apparatus of FIG. 6, when the engine 5 is running, valve 33 is closed and compressed air from the engine driven compressor 17 charges actuator 31 which allows compressed air in the actuator 27 to discharge, thus closing the starter valve 25 shutting off the supply of compressed air to the starter motor 8. If the engine 5 stops while the electric main 3 is still dead, valve 33 opens due to lack of engine oil pressure, discharging actuator 31 to shift valve 30. With the valve 30 thus shifted, starter valve 25 will be opened by actuator 27 to supply compressed air to the starter motor 8 for restarting. The starter valve 125 is held closed by spring 26 while engine 5 is running. Although not shown in the drawings, referring to the block diagram of FIG. 2, stopping of the engine starter 8 by the engine running detector 12 can also be accomplished by connecting the engine running detector 12 to the power failure detector 7 or the operative connection 11 so as to overcome the signal from the power failure detector 7 to the starter valve 10 when the engine starts.

Engine Operation Switch

The engine operation switch 13 or 113 may be an ignition, fuel, or combustion air control which is operated by a spring-biased actuator 36.

Load Drive System

In the apparatus shown in the diagrams of FIGS. 1, 2, and 5 the load 1 is normally driven by electric motor 2 through transmission 4 with automatic clutch 6 disengaged. Upon failure of power in main 3 motor 2 stops and when engine 5 starts, clutch 6 engages so that stand-by engine 5 can drive the load through transmission 4.

In the system of FIG. 3, the stand-by engine 5 drives a direct coupled electric generator 37 to provide power to an electrical load 1 upon failure of the power main 3. A similar engine output system could be used with any of the other engine starting, running, and stopping controls shown in FIGS. 1, 2, 4, 5, and 6. If the electrical load 1 consists mainly of lamps the inrush current upon connecting generator or main power to the load can amount to ten to twenty times the normal load. The engine driven generator 37, the stand-by engine 5, wiring, and load transfer switch 38 must therefore be designed for such a load. With power "on" in main 3, a spring biased actuator 39 holds switch 38 in the right hand position connecting the load to the electric supply main 3. Actuator 39 is connected by a quick exhaust valve 40 as used on truck brake systems to engine running detector 12 so that when the engine starts to run following power failure, compressed air from the engine running detector will cause actuator 39 to disconnect the load from the main 3 and connect it to the engine driven generator. Since the breaking of the contacts of switch 38 connecting the load to main 3 will not occur until after the time delay caused by tank 23 and restrictor 18 following power failure, the voltage at which switch 38 is opened will be low or zero thus reducing or eliminating arcing. Since switch 38 will not be closed, connecting the load 1 to the generator 37, until it receives a signal from the engine running detector 12 pressurizing actuator 39, the engine 5 should be at full speed and generated voltage normal upon closing of switch 38 connecting the load 1 to the engine driven generator 37.

Upon restoration of power in main 3 and stopping of the engine 5 by the power failure detector 7 in co-operation with engine switch 113, pressure in the engine running detector 12 will be released to atmosphere and air in actuator 39 will be released first through valve 33 and then as pressure drops sufficiently (40 psi in some quick exhaust valves) the remainder is released quickly through valve 40. A quick release of pressure will allow a snap action of switch 38 from its connection with the engine driven generator 37 to the main 3. Since actuator 39 cannot open switch 38 to return the load 1 to main 3 until the engine 5 stops, generator output will be zero when the contacts of switch 38 open, thus eliminating arcing upon opening of the circuit.

In the apparatus of FIG. 4, the motor 2 is direct coupled to the load 1, and the clutch 6 is engaged and disengaged by actuator 39 connected to the engine running detector 12. With this arrangement, the engine 5 will be running and up to governed speed before being connected to the load thus easing starting as is true in the arrangement of FIG. 3. Upon restoration of power and subsequent stopping of engine 5, the clutch 6 will be disengaged by the bias spring action of actuator 39 as air is exhausted through valve 33 of the engine running detector 12.

In the apparatus of FIG. 6, the load is represented by a pump 57 which requires power when a float 41 reaches a control level in sump 42. When power is available in main 3, the pump 57 is driven through transmission 4 by motor 2 as float 41 closes switch 43. A hydraulic pump 44 is driven directy by engine 5. A by-pass valve 45 is normally held open by bias spring 46 to return oil to the hydraulic tank 47. When the engine is stopped and the pump 57 is driven by motor 2, a hydraulic motor 48 also coupled to transmission 4 acts as a pump being allowed to turn freely as oil passes from it through the by-pass valve 45. This arrangement acts in the manner of an over-running clutch at this time.

When the stand-by engine 5 is running the pump 57 is driven by hydraulic motor 48 only through float 41 operating a three-way valve 49. When the float 41 is raised to call for operation of pump 57, compressed air from tank 15 is passed through four-way valve 30, a shutoff valve 50, and the three-way valve 49 to the actuator 51 raising the engine speed from an idle setting to the speed required to drive the pump 57 through hydraulic motor 48 and transmission 4. Compressed air is also admitted through valves 30, 50, and 49 to actuator 52 closing by-pass valve 45. When the float 41 drops below control level, valve 49 closes the line from the compressed air supply tank 15 and vents the line to actuators 51 and 52 to atmosphere so that the hydraulic pump 44 output is by-passed, stopping motor 48 and reducing engine speed to idle.

During normal operation of the pump 57 by power from main 3, it is essential that the hydraulic motor 48 be by-passed to allow the transmission 4 to turn freely. By-passing of the hydraulic motor 48 is accomplished by shutting off the supply of compressed air to actuator 52, thus allowing by-pass valve 45 to open. Shut-off valve 50 is used for this purpose, its actuator 64 being charged by compressed air from the power failure detector 7 to close valve 50. When the power fails in main 3, actuator 64 discharges through vent 118, and the bias spring 65 opens valve 50. Upon power failure, actuator 31 also discharges through vent 118 shifting valve 30 to cut off the supply of compressed air through valves 50 and 49 to actuators 52 and 51 until the engine has started, and the compressor 17 recharges actuator 31. Thus for starting of the by-pass engine 5, actuator 51 sets the engine speed control 66 at idle and actuator 52 allows by-pass valve 45 to open and unload the engine 5.

Other Control Elements

A pressure switch 53, the actuator of which is connected to the compressed air supply 9 of FIGS. 2 and 6 calls for operation of the motor driven compressor 16 whenever pressure of the supply drops below the operating pressure which is nominally 100 psi. Another pressure switch 54, the actuator of which is connected to the power failure detector system 7 in FIGS 3, 5, and 6 calls for operation of the motor driven compressor whenever the power failure detector system pressure drops below the operating pressure.

In the system of FIG. 6, the engine switch 113 is selected or adjusted so that the pressure required to shut off the engine switch 113 is much lower than operating pressure. A spring biased priority valve 58 between compressor 16 and air supply tank 15 is set to remain closed until compressor discharge pressure reaches 75 psi. This insures that the smaller tank 23 is filled to 75 psi before air can also be directed into the larger tank 15. Since air from compressor 16 is not flowing into both tanks simultaneously following restoration of power the time required to shift engine switch 113 to the off position is reduced. This allows the use of a small inexpensive low power motor driven compressor possibly of the diaphragm type.

A uni-directional valve 22 prevents loss of pressure from supply 9 through motor driven compressor 16 or the power failure detector system 7 as seen in FIGS. 2, 3, and 6. A second uni-directional valve 55 prevents loss of air from supply 9 through the engine driven compressor 17 and engine running detector 12 as seen in FIGS. 2, 3, 4, and 6. A third uni-directional valve 56 prevents loss of air from the power failure detector 7 through the motor driven compressor 16 when it is not running as seen in FIG. 6.

A service and test switch 62 is also shown in FIG. 6.

METHOD OF OPERATION OF THE INVENTION

The details of operation of each of the elements of my invention for each of the embodiments have been explained above, however an explanation of the overall operation of the system is explained below.

In the apparatus as shown in FIG. 1, the load 1 is normally driven by motor 2 through transmission 4 and when power fails in main 3, the power failure detector 7 through operative connection 14 turns on engine operation switch 13 and through operative connection 11 opens starter valve 10. Compressed air discharged from supply 9 into motor 8 drives engine 5 to start it. When the engine 5 has caught and is running, the engine running detector 12 closes the starter valve 10 through operative connection 24 and the automatic clutch 6, which may be a form of over-running clutch, drives load 1 through transmission 4. Should the engine 5 falter and die, the engine running detector 12 will again open starter valve 10 to restart the engine 5, engine operation switch 13 remaining in the "on" position.

Upon resumption of power in main 3, the motor 2 will assist the engine 5 in driving load 1 and the power failure detector 7 will turn off the engine operation switch 13 through operative connection 14 to stop the engine 5. The motor 2 will then assume the full load and the over-running clutch 6 will allow the transmission 4 to drive free of the stopped engine 5. All other embodiments shown operate in this manner generally.

In the apparatus of FIG. 2, during normal operation with power available in main 3, motor driven compressor 16 is driven through operation of pressure switch 53 as required to maintain pressure in tank 15 at 100 psi, starter valve 25 is closed by bias spring 26, and engine operation switch 13 is held in the off position by the bias spring of actuator 36. When power fails in main 3, solenoid 20 is overcome by bias spring 21 to shift valve 19 to its other position allowing compressed air from tank 15 to enter actuators 27 and 36 through operative connections 11 and 14. Actuator 36 turns the engine operation switch 13 on and actuator 27 opens the starter valve 25 allowing compressed air to be discharged into starter motor 8. When the engine 5 starts, oil pressure in the engine lubrication system builds up in actuator 28 of the engine running detector 12 to close starter valve 29 thus shutting off the air supply to starter motor 8. Should the engine falter and stop, oil pressure will drop allowing bias spring 30 to re-open valve 29 to again discharge compressed air into starter motor 8. When power resumes, solenoid 20 overcomes bias spring 21 to shift power failure detector valve 19 venting actuators 27 and 36 to atmosphere thus turning the engine operation switch off, stopping the engine 5 and closing starter valve 25. As the engine 5 stops, engine running detector actuator 28 relaxes to allow starter valve 29 to open thus leaving the two starter valves in position for starting the engine at the next power failure. During operation of the stand-by engine 5, engine driven compressor 17 recharges supply tank 15 to restore its supply.

In the apparatus of FIG. 3 during normal (main power on) operation, compressor 16 is operated by pressure switch 54 when pressure in the power failure detector system drops below 100 psi. Upon loss of power in main 3, motor driven compressor 16 will not operate and solenoid 20 relaxes to allow spring 21 to open solenoid-operated valve 219. As air bleeds out of the power failure detection system 7 and its time delay tank 23 through vent 18, the pressure in actuator 36 becomes low enough to allow its bias spring to turn engine switch 13 on and in actuator 27 low enough to allow bias spring 26 to open starter valve 125 thus supplying compressed air from supply tank 15 into starter motor 8. When the engine has caught and is running, engine running detector valve 33 is closed and the pressure of air supplied from engine compressor 17 builds up sufficiently in actuator 28 to close starter valve 125, shutting off the supply of compressed air to starter motor 8. Should the engine falter and stop, engine running detector valve 33 will re-open venting air in actuator 28 to atmosphere thus allowing starter valve 125 to re-open. Upon resumption of power in main 3, motor driven compressor 16 will again be operated to build up pressure in the power failure detector system 7 to shut off the engine through actuator 36, to hold the starter valve in the closed position through actuator 27 and relaxing actuator 28 as the engine stops. Switching of the load from main 3 to generator 37 and returning it to the main 3 is described above under the heading "Load Drive System".

In the apparatus of FIG. 4, when power is "on" in main 3, solenoid 20 holds power failure detector valve 119 in position to supply compressed air from supply tank 15 to the time delay tank 23, starter actuator 27 holding starter valve 125 closed and actuator 36 holding the engine operation switch 113 in the off position. Upon loss of power in main 3, solenoid 20 is over come by bias spring 21 and power failure detector valve 119 switches, shutting off the line 14 from supply tank 15 and venting the power failure detector system 7 to atmosphere. When pressure in time delay tank 23 has dropped sufficiently, the bias spring of actuator 36 turns the engine operation switch on and bias spring 26 overecomes actuator 27 to open starter valve 125 thus discharging compressed air from supply tank 15 into starter motor 8. When the engine is running, the engine oil pressure actuator 34 shuts off valve 33 allowing the output from engine compressor 17 to build up sufficiently to cause actuator 28 to shut off starter valve 29, thus closing off the supply of compressed air to starter motor 8 and causing actuator 39 to engage the standby engine with the load 1 through clutch 6. Should the engine falter and stop, the engine oil pressure will drop, valve 33 will open to vent compressor output airline, and actuator 28 will allow starter valve 29 to re-open. During engine operation, the load will be driven by the engine 5 and compressor 17 will recharge tank 15. Upon resumption of power, solenoid 20 will switch power failure detector valve 119 to again connect supply tank 15 to actuators 27 and 36 to shut off the engine 5 and starter valve 125 and to recharge time delay tank 23.

In the apparatus of FIG. 5, when power is "on" in main 3, motor driven compressor 16 maintains pressure in main supply tank 15 through spring-biased check valve 59, time delay tank 23, actuator 27, and actuator 36 at 100 psi as regulated by pressure switch 54 thus holding starter valves 125 closed and engine operation swtich 36 off. Solenoid 20 holds power failure detector valve 219 in the closed position.

When power fails in main 3, motor driven compressor 16 will cease to operate and solenoid 20 will relax to allow powere failure detector valve 219 to open thus venting air from the power failure detector system to atmosphere through restricted vent 118. As air leaves time delay tank 23, reducing the system pressure sufficiently, actuator 36 will turn engine operation switch 13 on and bias spring 26 will open starter valve 125 against actuator 27 to discharge compressed air from tank 15 into the starter motor 8. When the engine 5 has caught and is running, oil pressure builds up to cause actuator 28 to close starter valve 29. Should the engine 5 fail to start, oil pressure drops and starter valve 29 re-opens to discharge compressed air into starter motor 8. The engine 5 drives the load 1 through automatic clutch 6 and transmission 4, motor 2 free-wheeling. Upon resumption of power, solenoid 20 closes valve 219 to prevent air from the power failure detector 7 and motor driven compressor 16 is operated by pressure switch 54 to raise the pressure of the power failure detector system 7 to 75 psi before spring biased check valve 59 opens. Pressure in this system causes actuator 27 to close starter valve 125 and shut off the engine operation switch 13 through actuator 36. When the engine stops, oil pressure drops and actuator 28 allows starter valve 29 to re-open. The compressor 16 continues to supply tanks 23 and 15 until the pressure is restored to 100 psi.

In the apparatus of FIG. 6 when power is "on" in main 3, pressure switches 53 and 54 control the operation of motor driven compressor 16 to maintain pressure in supply tank 15 and time delay tank 23 at 100 psi. Solenoid 20 holds power failure detector valve 219 closed. Motor 2 drives pump 57 through transmission 4 when float switch 43 closes. Biased valve 50 is held in the closed position so that float 41 operation will not waste air in operating engine speed control 51 when the engine is off.

When power fails in main 3, or when test switch 62 is opened, the motor driven compressor 16 will be put out of operation and solenoid 20 will be de-energized allowing bias spring 21 to open valve 219 to vent the power failure detection system to atmosphere through adjustable restricted vent 118.

When the pressure in time delay tank 23 has dropped sufficiently, biased actuator 36 will turn engine switch 113 on, the actuator 64 of biased valve 50 will relax allowing bias spring 65 to open valve 50, and the actuator 31 of biased four-way valve 30 will relax to allow bias spring 63 to shift valve 30. When valve 30 is shifted, the supply tank 15 will be connected to actuator 27 which opens starter valve 25 and vents the line from valve 50 to atmosphere. As air from tank 15 passes through starter valve 25 into motor 8 to rotate engine 5 for starting, the engine speed control 66 is held at a low idle setting as air in the actuator 51 is vented to atmosphere through valve 49 or through valves 50 and 30. The hydraulic oil by-pass valve 45 is held open to unload the engine driven hydraulic drive by by-passing the hydraulic motor 48 during starting.

When the engine 5 catches and is running, oil pressure in actuator 34 closes valve 33 so that the engine driven compressor 17 output builds up pressure in actuator 31 as it passes through shuttle valve 32. Valve 30 is then shifted by actuator 31 venting actuator 27 to atmosphere to close starter valve 25 and connecting the line into valve 50 to the supply tank 15. Engine compressor 17 output also recharges supply tank 15 until governed pressure is reached. When float control 41 reaches control level three-way valve 49 opens the line from the tank 15 through valves 30 and 50 to actuators 52 and 51 thus raising engine speed and closing by-pass valve 45. Hydraulic pump 44 will then supply oil to hydraulic motor 48 to drive pump 57 through transmission 4. When float 41 drops below control level three-way valve 49 closes off the pressure supply line from valve 50 and vents actuators 51 and 52 to atmosphere to reduce engine speed to idle, and by-pass hydraulic pump output to tank 47 thus using a minimum amount of fuel until pump operation is again required.

Should the engine falter and stop upon starting, engine oil pressure will drop and actuator 34 will relax allowing valve 33 to vent engine driven compressor 17 discharge line to atmosphere. Loss of pressure at actuator 31 will cause four-way valve 30 to shift thus delivering compressed air to actuator 27 to re-open starter valve 25 and repeat the starting cycle. Upon resumption of power in main 3, solenoid 20 closes valve 219 to prevent venting of the power failure detector system 7 and pressure switch 54 being closed allows motor driven compressor 16 to rebuild pressure in the power failure detection system to system pressure. With return of pressure to 50 psi in the power failure detection system, actuator 36 controls engine operation switch 13 to stop the engine and flow switch 43 again controls motor 2 to drive pump 57 when the float 41 reaches control level.

It thus can be seen that in an air operated power transfer system of this invention, the load can be smoothly transferred from main to stand-by engine and back to main without the use of high load capacity electrical switches but with the use of relatively simple air controls. Potential energy for starting the engine is stored in a simple pressurized tank which needs very little maintenance. A simple continuous duty solenoid valve in most embodiments performs the key functions in detecting power failures. When the stand-by engine drives a generator for electrical power, transfer can be accomplished in such a manner that switches are opened only at relatively low or no voltage so that arcing is held to a minimum. The air powered power transfer system of my invention is thus relatively simple to manufacture and maintain.

I claim:

1. In a power transfer apparatus having a stand-by engine to meet a demand for power during a failure in the normal electrical power supply to a load, an engine starting and control means to start the engine upon failure of the normal power supply, run the stand-by engine during the power failure with the engine coupled to the load, and stop th stand by engine when the normal power supply is restored comprising:
   a. a compressed air supply;
   b. a compressed air starter motor operatively connected to the stand-by engine to drive the engine for starting;
   c. a starter valve means operatively connecting the compressed air supply with the compressed air starter motor so that when the valve means is open air can flow from the air supply to the starter motor;
   d. a power failure detector operatively connected to the normal electrical power supply;
   e. means connecting the power failure detector to the starter valve means for opening the starter valve means upon failure of the normal power supply;
   f. an engine running detector operatively connected to the stand-by engine for determining whether the engine is running;
   g. means connecting the engine running detector to the startr valve means for closing the valve when the engine is running;
   h. a two position engine operation switch operatively connected to the stand-by engine having an "on" position for allowing the engine to run and an "off" position for preventing the engine from running; and
   i. means operatively connecting the power failure detector to the engine operation switch so that the switch will be "on" during power failure and "off" when normal power is available so that the engine may be started and run when power fails and will be shut off when normal power returns.

2. An engine starting and control means as claimed in claim 1 wherein the power failure detector comprises an electrically operated return biased valve means having an outlet port operatively connected to the means connecting the power failure detector to the starter valve means and the means connecting the power failure detector to the engine operation switch, an atmospheric pressure port, and a port operatively connected to the compressed air supply, such electrically operated valve means being operatively connected to the normal electric supply, so that with power "on" the outlet port is connected to atmospheric pressure and the compressed air supply port is closed and when power fails, the outlet port is connected to the compressed air supply so that upon power failure compressed air passing through the power failure detector can be used to open the starter valve and switch on the engine running control.

3. An engine starting and control means as claimed in claim 1, wherein the power failure detector comprises an electrically operated return biased valve means having an outlet port operatively connected to the means connecting the power failure detector to the starter valve means and the means connecting the power failure detector to the engine operation switch, an atmospheric pressure port, and a port operatively connected to the compressed air supply so that with power "on" the outlet port is connected to the compressed air supply and when power fails the outlet port is connected to atmospheric pressure so that upon power failure compressed air in the connecting means between the power failure detector, the starter valve, and the engine operation switch will escape to allow the starter valve to open and the engine operation switch to be turned on.

4. An engine starting and control means as claimed in claim 1, wherein the compressed air supply comprises a storage tank means for compressed air operatively connected to a factory compressed air system.

5. An engine starting and control means as claimed in claim 1, wherein the compressed air supply comprises a storage tank means for compressed air, a uni-directional valve, and an electrically driven compressor having a discharge port operatively connected to the storage tank means by the uni-directional valve so that air may flow from the compressor to the tank means and means operatively connecting the compressor with the normal electrical power supply.

6. An engine starting and control means as claimed in claim 1, wherein the compressed air supply comprises a storage tank means, an electrically driven compressor operatively connected to the normal electrical power supply, the storage tank means, and a stand-by engine driven compressor operatively connected to the storage tank means.

7. An engine starting and control means as claimed in claim 2, wherein the starter valve means comprises a starter valve biased to a closed position and comprises an air pressure actuator operatively connected to the starter valve and to the outlet port of the power failure detector, such that when power is "on" the actuator is exhausted to atmosphere and when power fails, the actuator is connected to the compressed air supply to open the starter valve against the biasing force.

8. An engine starting and control means as claimed in claim 7, wherein the starter valve means also comprises a second starter valve operatively connected in series with the first starter valve between the compressed air supply and the starter motor, wherein the second starter valve is biased to an open position and comprising a connecting means between the engine running detector and the second starter valve such that the second starter valve will be closed by the engine running detector thus stopping the starter motor when the engine is running.

9. An engine starting and control means as claimed in claim 2 wherein the bias return for the power failure detector also comprises a time delay means such that the valve will not change position upon momentary power losses.

10. An engine starting and control means as claimed in claim 3, wherein the atmospheric pressure port from the power failure detector is restricted and wherein a compressed air storage tank is operatively connected to the outlet port of the power failure detector whereby pressure is sustained in the power failure detector, outlet port over momentary power failures.

11. An engine starting and control means as claimed in claim 5, wherein:
   a. the starter valve means comprises a shutoff valve biased to open;
   b. the power failure detector comprises an electrically closed shutoff valve biased to open upon loss of electricity, operatively connected to the normal electrical supply, having an inlet port operatively connected to the compressor and an outlet port open to atmosphere;
   c. the means connecting the power failure detector to the starter valve comprises a first air actuator operatively connected to the starter valve to close it and piping connecting the actuator to the inlet port of the power failure detector;
   d. the means connecting the engine operation switch to the power failure detector comprises a second air actuator operatively connected to the switch to turn the switch off against an opposing bias, and piping operatively connecting the second actuator to the inlet port of the power failure detector whereby, when normal power is "on" air under pressure from the electrically driven compressor fills the first actuator to hold the starter valve closed and the second actuator to hold the engine switch off and when power fails, the compressor stops, the power failure detector opens, and the air escapes from the first and second actuators to open the starter valve and turn the engine switch on.

12. An engine starting and control means as claimed in claim 11, also comprising a second air compressor having a discharge port and operatively connected to the stand-by engine to be driven thereby, wherein the engine running detector comprises a third shutoff valve held closed against an opposing bias to the open position by a third actuator operatively connected to the engine oil system, said third shutoff valve having an inlet port operatively connected to the second air compressor discharge port and an outlet port open to atmosphere and the means connecting the engine running detector to the starter valve means comprises a fourth air actuator operatively connected to the starter valve to close it and a piping connecting the fourth air actuator and the discharge port of the second compressor, whereby when the engine starts and the engine oil pressure rises, the third actuator shuts the third shutoff valve and air from the second compressor fills the fourth actuator to close the starter valve.

13. An engine starting and control means as claimed in claim 11, wherein:
   a. the starter valve means also comprises a second shutoff valve operatively connected to a third actuator to close the second valve against a biasing force normally opening the second valve, said second valve being operatively connected in series with the first valve between the compressed air supply and the starter motor; and
   b. the third actuator is operatively connected to the engine running detector whereby, when the engine starts, the third actuator will close the second valve thus shutting off the supply of air to the starter motor.

14. An engine starting and control means as claimed in claim 11 wherein the power failure detector also comprises a second air tank operatively connected to the inlet port of the power failure detector and a flow restrictor interposed between the outlet port of the power failure detector and atmosphere whereby, upon opening of the power failure detector shutoff valve when power fails, a time delay will occur in the dropping of pressure in the power failure detector as air escapes from the second tank through the flow restrictor.

15. An engine starting and control means as claimed in claim 5, wherein:
   a. the starter valve means comprises a shutoff valve and an air actuator operatively connected to the shutoff valve to open the shutoff valve against a closing bias;
   b. the power failure detector comprises an electrically closed shutoff valve biased to open upon loss of electricity, operatively connected to the normal electrical supply, having an inlet port operatively connected to the compressor and an outlet port open to atmosphere;
   c. the means connecting the power failure detector to the starter valve means comprises a fourth valve having an inlet port operatively connected to the compressed air supply, an outlet port open to atmosphere, and a second outlet port operatively connected to the starter valve actuator, said fourth valve biased to connect the starter valve actuator to the compressed air supply, a second air actuator operatively connected to the fourth valve to shift the fourth valve to a position in which the starter valve actuator is connected to the atmospheric pressure port and piping operatively connecting the second air actuator to the power failure detector valve inlet whereby power is "on" in the normal electrical supply the starter valve will be closed and when power fails the starter valve will open.

16. An engine starting and control means as claimed in claim 15, wherein the atmospheric pressure port from the power failure detector is restricted and a compressed air storage tank is operatively connected to the inlet port of the power failure detector.

17. An engine starting and running control means as claimed in claim 1, also comprising an electric motor operatively connected to the normal electrical supply and a transmission operatively connecting the electic motor to the load, an automatic clutch operatively connecting the stand-by engine drive shaft with the transmission whereby when the power is "on" in the normal electric supply the load will be driven by the motor with the engine stopped and when power fails and the engine is running the load will be driven through the clutch and transmission by the stand-by engine.

18. An engine starting and running control means as claimed in claim 17, wherein the clutch is an over-running clutch.

19. An engine starting and running control as claimed in claim 1, also comprising:
  a. an electrical generator operatively connected to the stand-by engine for driving thereby;
  b. an electrical double throw switching gear operatively connected to the load and alternatively to the normal electrical supply or to the generator output; and
  c. an actuator operatively connected to the engine running detector and the switching gear such that when the engine is running the switching gear is shifted to connect the load with the generator output against a bias normally holding the switching gear in position to connect the load with the normal electrical supply.

20. An engine starting and running control as claimed in claim 1, also comprising:
  a. an electric motor operatively connected to the normal electrical supply and to the load;
  b. a clutch operatively connected to the stand-by engine drive shaft and to the load;
  c. an air actuator operatively connected to the engine running detector and the clutch whereby when the engine is running the air actuator overcomes a biasing force normally holding the clutch disengaged to engage the clutch so that the stand-by engine will drive the load.

21. An engine starting and running control as claimed in claim 1, also comprising:
  a. an engine speed control operatively connected to the stand-by engine and biased to a low speed setting;
  b. a first air actuator operatively connected to the engine speed control and to the engine running control so as to overcome the bias shifting the speed control to a high speed setting when the engine is running;
  c. a motor operatively connected to the normal electrical supply;
  d. a transmission operatively connected to the load and to the motor;
  e. a clutch operatively connected to the stand-by engine and to the transmission; and
  f. a second air actuator operatively connected to the clutch and to the engine speed control whereby when the engine is not running the engine speed control is set at a low speed setting for starting and the clutch is disengaged and when the engine is running the engine speed control is set at a high speed and the clutch is engaged.

22. An engine starting and control means as claimed in claim 1, wherein the engine running detector has an outlet port providing a source of compressed air when the stand-by engine is running and a vent to atmosphere when the engine is not running, also comprising:
  a. an engine speed control operatively connected to the stand-by engine and biased to a low speed setting;
  b. a motor operatively connected to the normal electrical supply for driving thereby;
  c. a transmission operatively connected to the load and to the motor;
  d. a clutch biased to a disengaged position operatively connecting the stand-by engine to the transmission and thus to the load;
  e. a load demand sensing device;
  f. a first air actuator operatively connected to the engine speed control to shift the control to a high speed setting;
  g. a second air actuator operatively connected to the clutch to engage the clutch;
  h. a second valve means having an atmospheric pressure port, a port operatively connected to the engine running detector outlet port, and a port operatively connected to the first and second air actuators; and
  i. a means operatively connecting the load demand sensing device to the second valve means so as to vent the first and second actuators to atmosphere during no load demand conditions and to the engine running detector upon load demand.

23. An engine starting and running control means as claimed in claim 1, also comprising:
  a. as a starter valve means a first shutoff valve operatively connected to the power failure detector to open the first shutoff valve during power failures and a second shutoff valve operatively connected in series with the first shutoff valve whereby when the first and second shutoff valves are open air from the compressed air supply will be admitted to the starter motor; and
  b. an engine running detector comprising:
    1. an engine-driven air compressor having a discharge port and operatively connected to the stand-by engine for driving thereby;
    2. an air actuator operatively connected to the compressor discharge port and to the second shutoff valve for closing said second shutoff valve against an opening bias;
    3. a third shutoff valve having an inlet port operatively connected to the compressor discharge port and an outlet port open to atmosphere; and
    4. an hydraulic actuator operatively connected to the engine oil system of the stand-by engine and to the third shutoff valve to close the third shutoff valve against an opening bias by pressure of the engine oil system when the engine is running.

* * * * *